United States Patent
O'Malley et al.

(10) Patent No.: US 9,286,546 B2
(45) Date of Patent: Mar. 15, 2016

(54) IDENTIFYING LABELS FOR IMAGE COLLECTIONS

(71) Applicant: Google Inc., Mountain View, CA (US)

(72) Inventors: Sean O'Malley, Mountain View, CA (US); Xuemei Zhao, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 229 days.

(21) Appl. No.: 13/838,108

(22) Filed: Mar. 15, 2013

(65) Prior Publication Data

US 2015/0169952 A1     Jun. 18, 2015

(51) Int. Cl.
*G06K 9/62*     (2006.01)
*G06F 17/30*     (2006.01)

(52) U.S. Cl.
CPC ........ *G06K 9/6255* (2013.01); *G06F 17/30244* (2013.01)

(58) Field of Classification Search
CPC ................................................. G06K 9/00684
See application file for complete search history.

(56) References Cited

U.S. PATENT DOCUMENTS

| 7,903,882 B2 | 3/2011 | Nagasaka | |
| 7,970,240 B1* | 6/2011 | Chao et al. | 382/305 |
| 2012/0106854 A1* | 5/2012 | Tang et al. | 382/224 |
| 2014/0093174 A1* | 4/2014 | Zhang et al. | 382/190 |

OTHER PUBLICATIONS

Jia, Jimin, Nenghai Yu, and Xian-Sheng Hua. "Annotating personal albums via web mining." Proceedings of the 16th ACM international conference on Multimedia. ACM, 2008.*

* cited by examiner

*Primary Examiner* — Andrew Moyer
(74) *Attorney, Agent, or Firm* — Fish & Richardson P.C.

(57) ABSTRACT

Methods, systems, and apparatus for identifying labels for image collections are presented. In one aspect, a method includes obtaining a collection of images; obtaining, for each image in the collection of images, image similarity data that indicates a measure of similarity of the image to other images in the collection of images; generating, based on the similarity data, two or more image clusters from the collection of images, each image cluster including one or more images from the collection of images; for each image cluster: obtaining, for each image in the image cluster, a set of image labels; generating, from each set of image labels obtained for each image in the image cluster, a set of cluster labels; selecting one or more cluster labels from the set of cluster labels; and identifying the selected cluster labels as a set of collection labels for the collection of images.

17 Claims, 5 Drawing Sheets

IDENTIFYING LABELS FOR IMAGE COLLECTIONS

BACKGROUND

This specification relates to identifying labels for image collections.

The Internet has enabled access to a wide variety of resources, e.g., video and/or audio files, images, web pages for particular subjects, news articles, etc. Access to these resources has likewise enabled opportunities for an internet user to aggregate resources of interest to the user. For example, a user may be interested in collecting images related to the user's dream home. Some web sites enable a user to gather resources of interest to the user into a collection that can be viewed by the user and potentially shared with other users.

SUMMARY

This specification describes technologies relating to making recommendations based on labels identified for image collections.

In general, one innovative aspect of the subject matter described in this specification can be embodied in methods that include the actions of obtaining a collection of images; obtaining, for each image in the collection of images, image similarity data that indicates a measure of similarity of the image to other images in the collection of images; generating, based on the similarity data, two or more image clusters from the collection of images, each image cluster including one or more images from the collection of images; for each image cluster: obtaining, for each image in the image cluster, a set of image labels; generating, from each set of image labels obtained for each image in the image cluster, a set of cluster labels; selecting one or more cluster labels from the set of cluster labels; and identifying the selected cluster labels as a set of collection labels for the collection of images. Other embodiments of this aspect include corresponding systems, apparatus, and computer programs, configured to perform the actions of the methods, encoded on computer storage devices.

These and other embodiments can each optionally include one or more of the following features. The method may further include providing the set of collection labels to a user device for display in association with the collection of images.

The method may further include identifying one or more candidate images based on the set of collection labels, each candidate image being different from each image in the collection of images; and providing data specifying one or more candidate images to a user device for display in association with the collection of images.

Identifying one or more candidate images may include: providing one or more of the collection labels to an image search apparatus; obtaining result images from the image search apparatus; and identifying one or more of the result images as candidate images.

The method may further include identifying one or more suggested collections based on the set of collection labels, each suggested collection being different from the collection of images; and providing data specifying one or more suggested collections to a user device for display in association with the collection of images.

Identifying one or more suggested collections may include: obtaining, for each of a plurality of candidate collections, a corresponding candidate set of collection labels; obtaining, for each candidate set of collection labels, set similarity data that indicates a measure of similarity of the candidate set of collection labels to the set of collection labels; selecting, based on the set similarity data of the candidate sets of collection labels, one or more candidate collections; and identifying the selected candidate collections as suggested collections.

Each image label included in the set of image labels may have a respective confidence score that is a measure of confidence that the image label accurately describes the content depicted in the image; and the set of cluster labels may be generated based on the respective confidence scores of the image labels included in each set of image labels for each image in the image cluster.

Each image in the collection of images may be included in only one of the image clusters.

Particular embodiments of the subject matter described in this specification can be implemented so as to realize one or more of the following advantages. Image collection labels may be used to identify and categorize topics for image collections. Labels may be suggested to users as labels that a user may wish to have associated with the user's collection of images. Images that are similar to images in a collection may be identified using collection labels, and these images may be presented to a user as images that a user may wish to include in the user's collection, satisfying an informational need of the user. In addition, similar collections may be identified and suggested to a user as image collections that may be of interest to the user. Other resources may be suggested to a user that are likely to interest the user based on the user's image collection, further satisfying the user's informational need.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

An image management system identifies labels for collections of images. Collection labels may be used, for example, to identify a topic for the collection, related images for the collection, and/or similar collections. For example, a user may organize a collection of images using an image management system. The image management system may suggest relevant topics to label the collection of images. The image management system may also suggest images to be added to the user's collection, or similar image collections that may be of interest to the user. The systems and methods disclosed herein facilitate the identification of labels for the collection of images.

For each image in a collection of images, image similarity data is obtained that indicates which images are similar to which other images in the collection. Based on the similarity data, image clusters are generated for the collection, and each image cluster includes images from the collection that are similar to one another. For example, a collection of images for a dream home may include images of living rooms, kitchens, dining rooms, and bathrooms. The image similarity data indicates which of the images are similar to one another, and generates clusters to include the images. Example clusters may include a living room cluster for images of living rooms, a kitchen cluster for images of kitchens, and so on.

Image labels are obtained for each image in a cluster. For example, image labels for an image in the living room cluster may include "living room," "family room," and "living room furniture." From the image labels of each image in a cluster, a set of cluster labels is generated for the cluster. For example, if there are five images in the living room cluster, each of the image labels obtained for each of those five images may be included in a set of cluster labels. From the set of cluster labels, one or more cluster labels are selected. For example, the cluster labels may be ranked according to confidence scores associated with the cluster labels, and the top two labels may be selected. The selected cluster labels for each cluster are identified as collection labels for the collection of images. For example, a set of labels for the dream home collection may include the top two labels from each image cluster, e.g., "living room," and "living room furniture" from the living room cluster, "bedroom," and "bedroom set" from the bedroom cluster, and so on.

Collection labels may be used for a variety of purposes. For example, the labels may be provided to a user as a suggestion for labeling the collection. The collection labels may also be provided to an image search system that identifies images that can be provided to the user as suggested images to be added to the collection. In another example, the collection labels may be used to identify similar image collections, and the similar image collections may be provided to the user for the user to browse.

Figure 1:
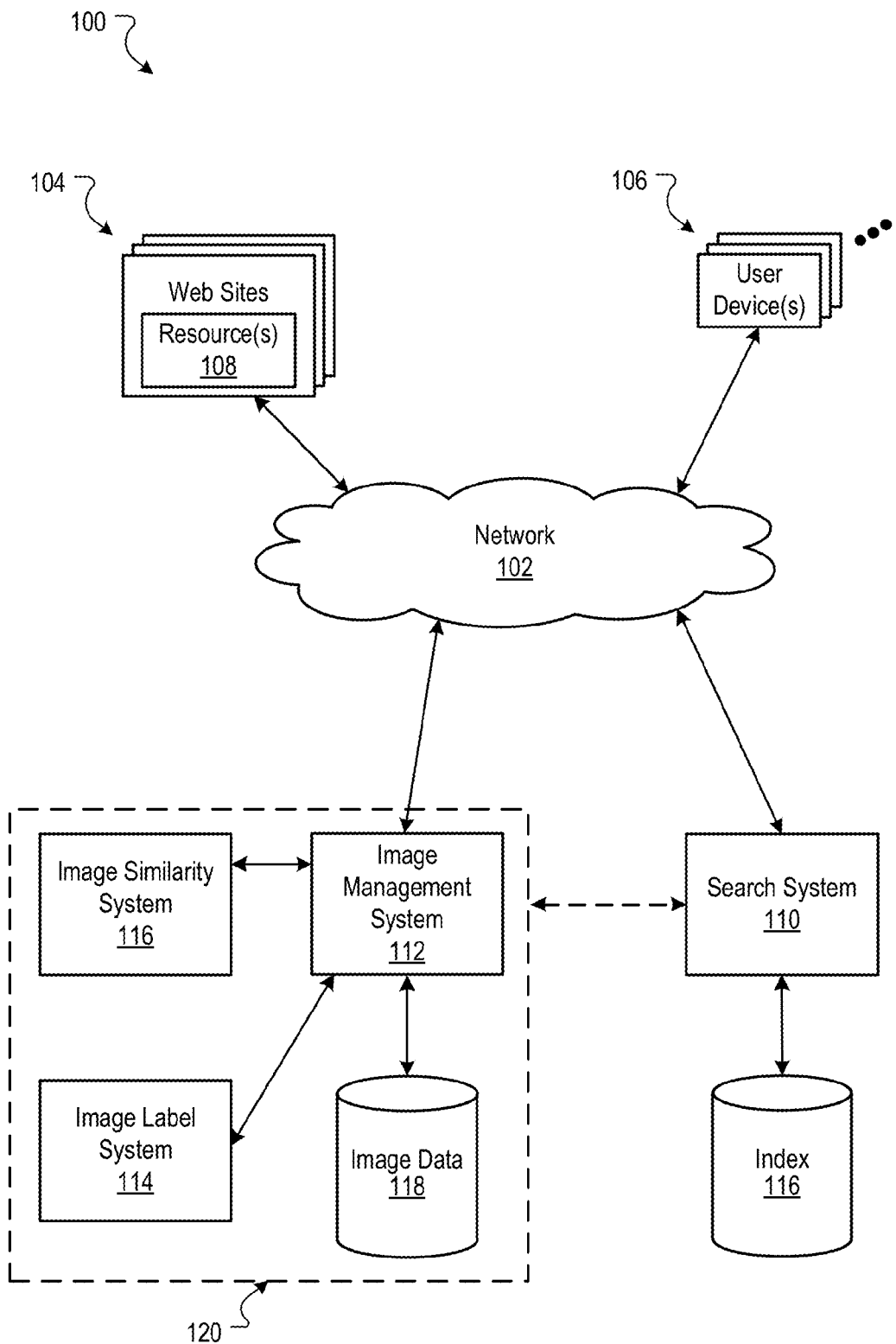
FIG. 1 is a block diagram of an example environment in which recommendations are provided for image collections.

FIG. 1 is a block diagram of an example environment 100 in which recommendations are provided for image collections. A computer network 102, such as a local area network (LAN), wide area network (WAN), the Internet, or a combination thereof, connects web sites 104, user devices 106, a search system 110, and an image management system 112. The online environment 100 may include many thousands of publisher web sites 104 and user devices 106.

A website 104 includes one or more resources 108 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104.

A resource 108 is any data that can be provided by a publisher over the network 102 and that is associated with a resource address. Resources include HTML pages, word processing documents, and portable document format (PDF) documents, images, video, and feed sources, to name just a few. The resources 108 can include content, such as words, phrases, pictures, and so on, and may include embedded information (such as meta information and hyperlinks) and/or embedded instructions (such as scripts).

A user device 106 is an electronic device that is capable of requesting and receiving resources 108 over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network.

To facilitate searching of these resources 108, a search system identifies the resources by crawling the publisher web sites 104 and indexing the resources provided by the publisher web sites 104. The indexed and, optionally, cached copies of the resources, may be stored in index 116.

The user devices 106 submit search queries to the search system 110. In response to the search request, the search system 110 uses the index 116 to identify resources that are relevant to the queries. For example, the search system 110 may identify the resources in the form of search results and return the search results to user devices 106 in a search results page resource. A search result is data generated by the search system 110 that identifies a resource that satisfies a particular search query, and includes a resource locator for the resource. An example search result can include a web page title, a snippet of text extracted from the web page, an image, and/or the URL of the web page.

The search results may be ranked based on scores related to the resources identified by the search results, such as information retrieval ("IR") scores, and optionally a separate ranking of each resource relative to other resources (e.g., an authority score). The search results are ordered according to these scores and provided to the user device according to the order.

The search system 110 may also generate search queries for which search results are generated. For example, the search system 110 can receive a search query that includes an image. The search system 110 can then determine one or more image labels that have been identified as relevant to the image, and use one or more of the image labels as a search query to receive search results relevant to the image.

An image label is data that is indicative of subject matter to which an image is relevant. Labels can be explicitly specified by a publisher of a web site 104 on which the image appears. Labels can also be generated, for example, based on text that appears near the image on the web page. For example, a label can be generated for an image based on text that is located adjacent to, e.g., within a threshold number of pixels of, the image or in a portion of a document that is identified as containing information relevant to the image, e.g., a frame in which the image is presented. A label can also be generated based on text that is included in the image, e.g., visually depicted in the image, or otherwise associated with the image, e.g., text included in a file name, text included in anchor text of a link to the image, or resource location of the image. Other appropriate ways of determining image labels can also be used.

An image label system 114 is a data processing apparatus that can generate labels for images. The image label system 114 can receive an image as input and return one or more labels that describe a topic of, or are otherwise semantically related to, the image. In some implementations, the image label system 114 can identify a label that is semantically related to an image based on data describing the image and/or data indicating which labels are semantically related to the image. Furthermore, in some implementations, image label system 114 can identify a label that is semantically related to an image based on data associating visual features of images with labels. For example, the image label system 114 can provide the image to an image relevance model that has been created for a particular label to determine the degree to which the image is relevant to the particular label. When the image relevance model receives an image as input, the image relevance model can output a relevance score indicating the degree to which the input image is related to the particular label corresponding to the image relevance model. Other appropriate ways of determining image labels can also be used.

The example environment 100 also includes an image similarity system 116. The image similarity system 116 can receive an image as input and identify other images that are similar to the image. The image similarity system 116 can also receive a collection of images as input and generate similarity data that identifies, for each image, how similar that image is to each other image in the collection. In some implementations, images can be identified as visually similar if the images have similar sets of visual features, such as similar colors, brightness, shapes, edge locations, and/or other similar attributes. For example, images of a sunrise will likely share similar colors, e.g., of a sky at sunrise, and shapes, e.g., of a sun appearing on the horizon. In some implementations, images can be identified as similar to one another if they have similar image labels. For example, image similarity between two images may be determined based on a number of matching image labels for the images. As another example, image similarity between two images may be determined based on a textual edit distance between one or more labels of a first image and one or more labels of a second image.

Using the image label system 114 and image similarity system 116, the image management system 112 identifies labels for collections of images. A collection of images includes two or more images that have been logically identified as part of a "collection." For example, a user may select multiple images and organize them in a single user-generated collection of images. The image management system 112 can suggest labels for association with collections of images. As with an image label, a collection label is data that is indicative of subject matter to which a collection is relevant. In some implementations, the image management system 112 uses collection labels and the search system 110 to identify images that can be suggested to users as images that are similar to images of the collection. The image management system 112 may also use collection labels to identify other collections that are similar to a particular collection and suggest the similar collections as collections of interest for a user associated with the particular collection. The operations performed by the image management system 112 are described in further detail below.

Image collections, image similarity data, and image labels, may be stored in the image data 118 data store. While the image management system 112 is depicted as a system that is separate from the image similarity system 116 and image label system 114, in some implementations each system may be combined in a single system 120.

Figure 2:
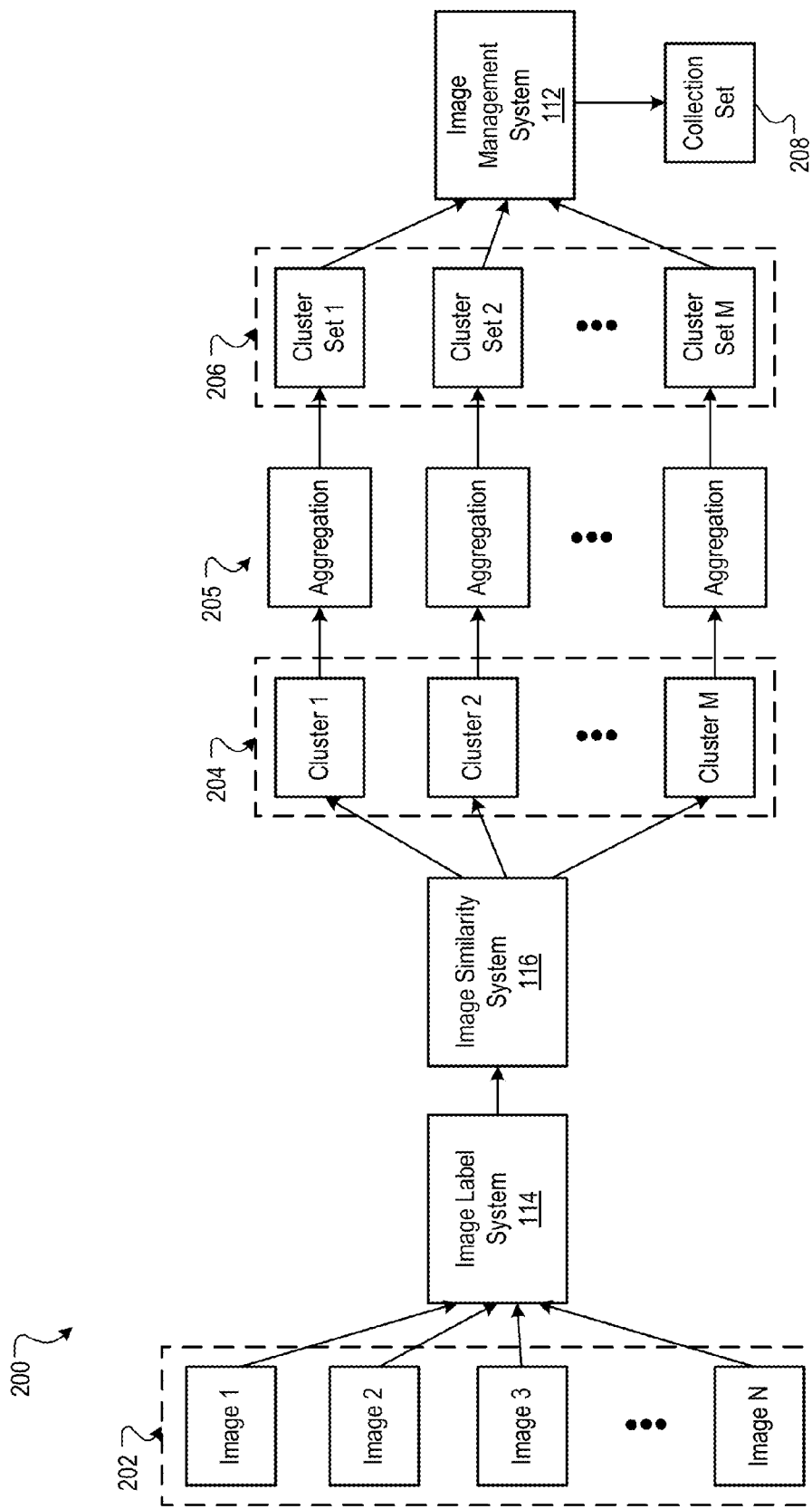
FIG. 2 is a block diagram of an example data flow for identifying labels for a collection of images.

FIG. 2 is a block diagram of an example data flow 200 for identifying labels for a collection of images 202. The data flow 200 identifies a list of collection labels for a single image collection 202.

Each image in a collection of images 202 is provided to the image label system 114. The image label system 114 provides a set of image labels for each image. The image labels, as described above, are data that is indicative of subject matter to which an image is relevant, such as a semantic description. In some implementations, each image label has a respective confidence score that is a measure of confidence that the image label accurately describes the content depicted in the image. For example, image labels and corresponding confidence scores, on a scale of 0.0 to 1.0, produced for an image of a kitchen may be as follows:

| Label | Confidence |
| --- | --- |
| Kitchen | 0.85 |
| Kitchen appliances | 0.51 |
| Cooking | 0.09 |

The foregoing indicates that, for the example kitchen image, the image labeling system 114 has a high confidence (0.85) that the image is an image of a kitchen, a moderate confidence (0.51) that the image is an image of kitchen appliances, and a low confidence (0.09) that the image is an image of cooking.

The labeled images in the collection of images 202 are provided to the image similarity system 116. The image similarity system 116 generates, for each image in the collection 202, image similarity data that indicates a measure of similarity of the image to other images in the collection 202. For example, the collection 202 may include images depicting various rooms of various homes, a number of images of home furniture, and images of home electronics and appliances. Image similarity data for an image of a sofa may indicate a relatively high measure of similarity to an image of a living room that includes a sofa but a relatively low measure of similarity to an image of a kitchen sink. Similarly, image similarity data for an image of a kitchen may indicate a relatively high measure of similarity to the image of a kitchen sink but a relatively low measure of similarity to an image of a big-screen television.

In some implementations, image similarity is determined based on images' content feature values, e.g., values indicative of visual features of an image and/or other image features. The content feature values can be extracted for each image represented in an image collection. The content feature values can be transformed into a sparse representation using a pre-computed dictionary of visual terms that represent a set of regions having similar content feature values. The extraction and transformation yields a "bag of features" for an image. Generally, the content feature values of an image quantitatively represent visual features of the image. Because the content feature values are represented as numerical values, a mathematical calculation can be performed to determine a measure of similarity between content feature values of two images. Other techniques may also be used to determine a measure of similarity between images.

Image clusters 204 are generated using the image similarity data. Images may be clustered by the image similarity system 116 or the image management system 112 by comparing the image similarity data of each image in the collection 202. For example, two images having content feature values meeting a threshold degree of similarity can be clustered together. The threshold may vary depending on how similar the images of a collection are to one another and the size of the collection. Three very similar images may, in one collection, be part of the same cluster, while in another collection they may be in different clusters. Clustering may be done by any suitable method, such as hierarchical agglomerative clustering or K means clustering.

By way of example, assume a collection of images consists of three images—one of a kitchen, one of a living room, and one of a bedroom. Each image may not be similar enough to either of the other two to be clustered together with any of them, and three separate clusters are the result. However, if the collection also included an image of a sink and another image of a bedroom, then the images of the sink and the kitchen may be clustered together, and the images of the bedroom may be clustered together based on the similarity of visual features.

In the example data flow 200, the example collection 202 may be clustered by room type. For example, Cluster 1 may include images of kitchens and images of kitchen appliances and fixtures, while Cluster 2 may include images of living rooms and living room furniture and electronics, and so on. In some implementations, each image in a collection of images may only be included in one of the image clusters while, in another implementation, an image may be included in multiple image clusters.

For each image cluster, a set of cluster labels is generated. Each set of cluster labels is generated from the sets of image labels obtained for each image in the cluster. In some implementations, the set of cluster labels for an image cluster includes the n image labels with the highest confidence scores. In another implementation, the set of cluster labels may include the top m image labels for each image in the cluster. Duplicate image labels may be moved, for example— only the highest scoring duplicate image label may be used, or an average or median score for a duplicate image label may be used.

In some implementations, the number of times an image label appears for the images of a cluster may be used to select cluster labels. For example, if the label, "kitchen appliances," is the label most often included in a set of image labels for images in an image cluster, "kitchen appliances" may be the top cluster label in the corresponding set of cluster labels. In the example data flow 200, this method of generating cluster labels is depicted by "aggregation" processes 205 performed, for example, by the image management system 112. Various other methods may be used for ranking and/or selecting the image labels to be included in the set of cluster labels for a cluster.

The image management system 112 selects at least one cluster label from the sets of cluster labels 206. In some implementations, the image management system 112 selects from each cluster set in a round-robin fashion until a certain number of cluster labels have been selected. In some implementations, a threshold may be used—such as a threshold number of labels, or a threshold confidence score that must be met for a cluster label to be selected. For example, the image management system 112 may select the top two scoring cluster labels from each of the cluster sets 206.

The selected cluster labels are identified by the image management system 112 as a set of collection labels 208 for the collection of images 202. In some implementations, the collection set 208 is ranked according to confidence scores associated with the labels. In some implementations, the collection list is ranked using confidence scores in a round-robin fashion according to the clusters from which each of the labels were obtained. For example, assume the following labels, organized by source cluster and shown with label confidence scores, were identified as collection labels:

| Cluster 1 | |
|---|---|
| Kitchen | 0.97 |
| Kitchen Cabinets | 0.82 |

| Cluster 2 | |
|---|---|
| Living Room | 0.92 |
| Family Room | 0.89 |

| Cluster 3 | |
|---|---|
| Bedroom Furniture | 0.94 |
| Bedroom | 0.91 |

In an implementation where collection labels are ranked according to confidence scores, the collection set may appear as follows:

| Label | Confidence |
|---|---|
| Kitchen | 0.97 |
| Bedroom Furniture | 0.94 |
| Living Room | 0.92 |
| Bedroom | 0.91 |
| Family Room | 0.89 |
| Kitchen Cabinets | 0.82 |

Any suitable method may be used to select, rank, and/or organize collection labels. Collection labels may be stored in a data store and updated from time to time. For example, the collection labels may be updated any time a user adds or removes an image to the collection, or after a certain number of images have been added or removed. In some implementations, the collection labels may be used to provide various recommendations to the user associated with the collection.

Figure 3:
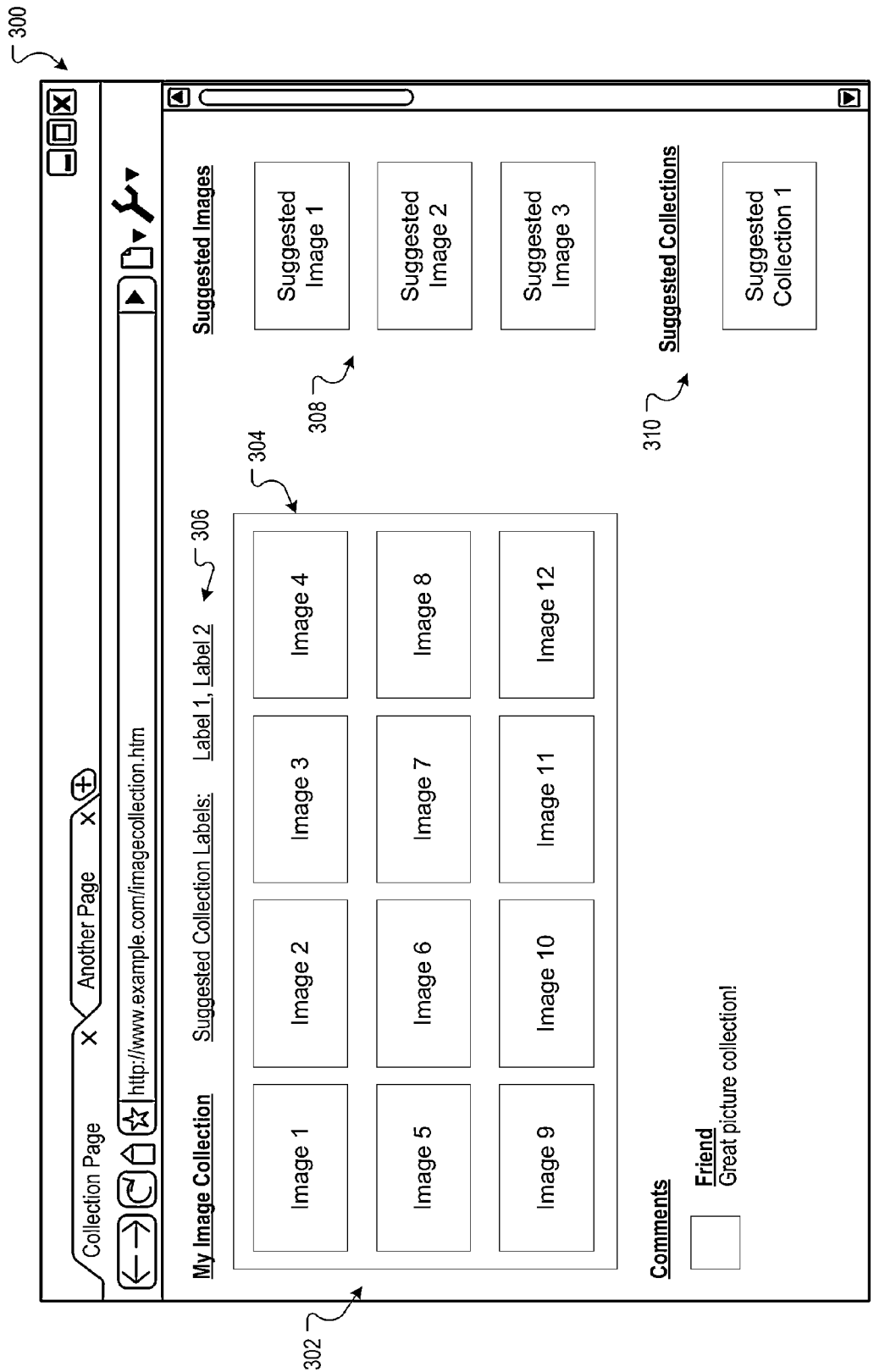
FIG. 3 is an example environment displaying recommendations for a collection of images.

FIG. 3 is an example environment 300 displaying recommendations for a collection of images 304. The example environment 300 depicts an image collection resource 302 rendered in a web browser of a user device.

In some implementations, at least one of the collection labels may be provided to a user device for display in association with the corresponding image collection. For example, collection labels may be displayed in a collection resource as suggested labels 306 for the collection of images. The particular collection labels displayed may be chosen by any suitable method, such as choosing x of the top-ranked collection labels. In some implementations, user selection of a suggested label causes the label to become associated with the image collection. For example, selection of a label may change the name of the collection to the label and/or may cause an association of the label with the collection to be stored in an image data store.

In some implementations, the image management system 112 may suggest images, e.g., images 308, to be added to a user's image collection. For example, the image management system 112 may provide at least one of the collection labels to an image search apparatus, such as the search system 110. The search system may identify images that are relevant to the collection labels and provide result images to the image management system. The image management system may then identify one or more of the result images obtained from the search system as candidate images, which may then be presented to a user device as suggested image.

For example, the image management system may send the collection label "kitchen" to the search system. The search system may identify images related to the label "kitchen," that are stored in a search index along with scores, such as a relevance scores, that each indicates how relevant an image is to the label, "kitchen." The image management system may then identify y of these result images with the top relevance scores as candidate images. Data specifying these candidate images may then be provided to a user device, which causes the candidate images to be displayed in the image collection resource 302, e.g., as suggested images 308. In some implementations, a user may select a suggested image to view the image, add the image to the collection, and/or remove the image from the list of suggested images.

In some implementations, each candidate image is different from each image in the collection of images. This may help, for example, prevent duplicate images from being presented to the user as suggested images. In some implementations, result images that are duplicates or near duplicates of images already in the collection may be identified and then removed from consideration as candidate or suggested images.

For example, the image similarity system 116 can be configured to identify images that are near duplicate images relative to images in a collection. In some implementations, near duplicate images are images that are identical except for differences in the way the images have been processed. In some examples, the differences between two near duplicate images are differences other than differences in visual features of the images. As one example, two identical images at different resolutions are near duplicate images. As another example, two images of the same object having different brightness, contrast, or other image attributes, e.g., image attributes adjusted in image processing software, can be near duplicate images. As another example, an un-cropped version of an image and a cropped version of the same image, e.g., cropped to remove a border in the image, can be near duplicate images. Images can be identified as near duplicate images if they satisfy a similarity threshold, e.g., a similarity score determined by the image similarity system 116 that exceeds a similarity threshold.

In some implementations, the image management system 112 may suggest one or more collections, e.g., collection 310, as collections that may be of interest to a user. For example, the image management system may identify image collections that are similar to the image collection 304 and select one or more of the most similar image collections as suggested collections. Any suitable method may be used to determine similarity between image collections.

In some implementations, the image management system uses collection labels to determine similarity between collections. For example, the image management system may obtain collection labels for a set of candidate collections. For each set of collection labels, the image management system may obtain similarity data that indicates how similar each set of candidate collection labels is to the collection set. By way of example, the image management system may compare sets of collection labels and corresponding confidence scores using dot product comparisons of label vectors. Based on the similarity between collection labels, one or more candidate collections are selected and identified as suggested collections.

In some implementations, each suggested collection 310 is different from the collection. Once a suggested image collection is identified, the image management system may provide a user device with data that causes the suggested image collection to be displayed in a collection resource. In some implementations, a user may select a suggested collection to view the image, add images from the suggested collection to the collection, and/or remove the collection from the list of suggested images.

Figure 4:
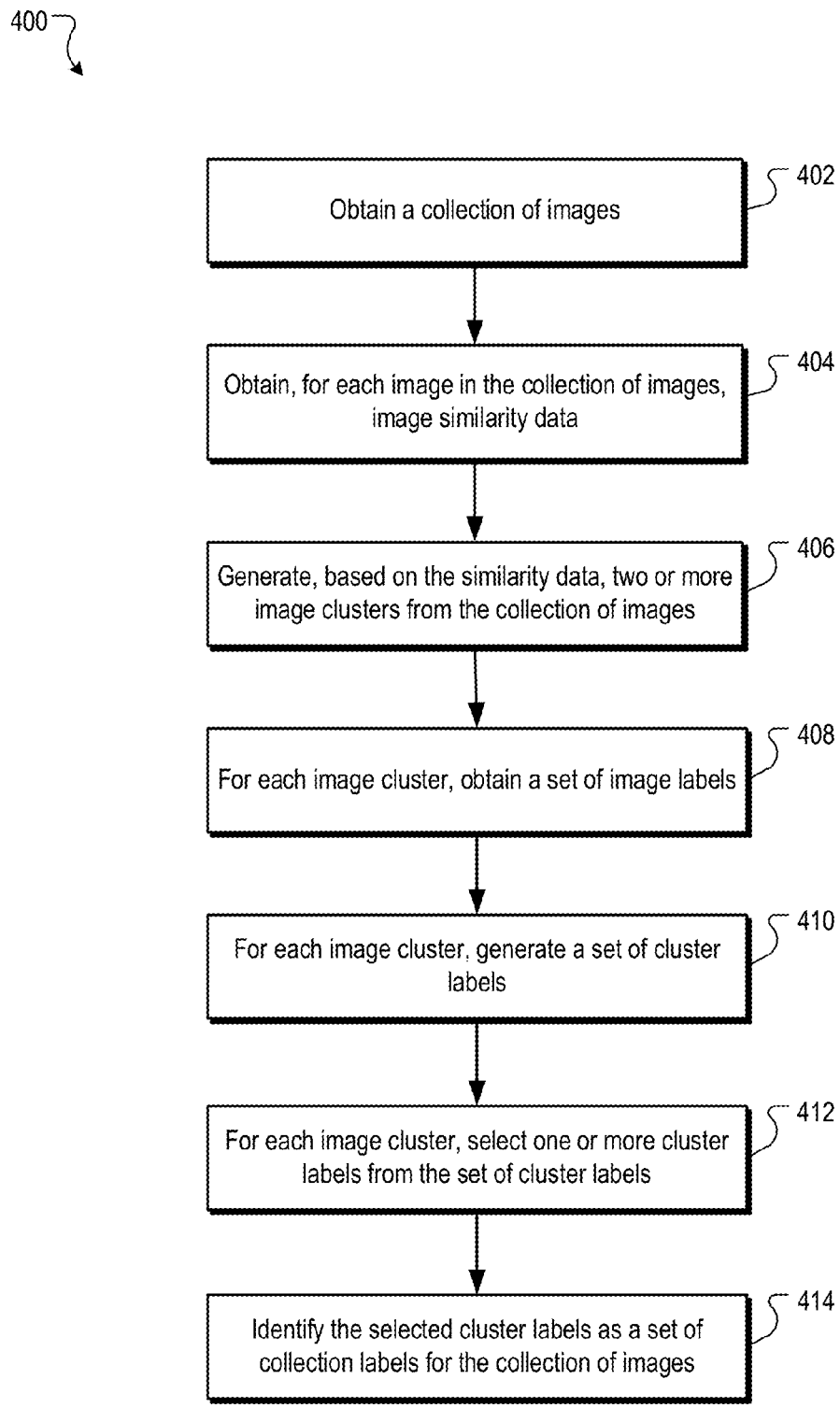
FIG. 4 is a flow diagram of an example process for identifying labels for a collection of images.

FIG. 4 is a flow diagram of an example process 400 for identifying labels for a collection of images. The process 400 may be implemented by a data processing apparatus that is configured to perform the operations described above, such as the image management system 112.

A collection of images is obtained (402). For example, a collection of various sports-related images may be obtained by an image management system, where images depict various sporting events, players, equipment, and memorabilia. In some implementations, image labels are also obtained for each image in the collection of images. For example, an image label system may obtain, for each image in a collection of images, a set of image labels and corresponding confidence scores for the labels.

For each image in the collection of images, image similarity data is obtained (404). In some implementations, the image similarity data includes or is derived from image labels that correspond to the images in the collection. Based on the similarity data, two or more image clusters are generated from the collection of images (406). Each image cluster includes one or more images from the collection of images. For example, a collection of sports images may be clustered based on sport, where one image cluster includes images related to baseball, while another includes images related to basketball, and so on. The clustering may be done, for example, by placing images with similar or matching labels into clusters with each other.

For each image cluster, a set of image labels is obtained (408). In some implementations, these labels are the same labels that were included in the similarity data. From each set of image labels obtained for each image in a cluster, a set of cluster labels is generated (410). For example, labels obtained for images in the baseball cluster may include "baseball," "baseball bat," "baseball team," "baseball game," "baseball player," etc. The most popular image labels may be used to generate the set of cluster labels. For example, if the label "baseball" appears most often in the cluster of baseball images, that may be chosen as a cluster label.

For each image cluster, one or more cluster labels are selected from the set of cluster labels (412). The selected cluster labels are identified as a set of collection labels for the collection of images (414). For example, the image management system may select the most popular label from each cluster, and identify these as a set of collection labels. The cluster label "baseball" may be selected from the baseball cluster, while the cluster label "basketball" may be selected from the basketball cluster, and so on. The collection labels may be used for a variety of purposes, e.g., to store as labels associated with the collection, to identify images that are similar to those in the image collection, and to identify similar collections.

Figure 5:
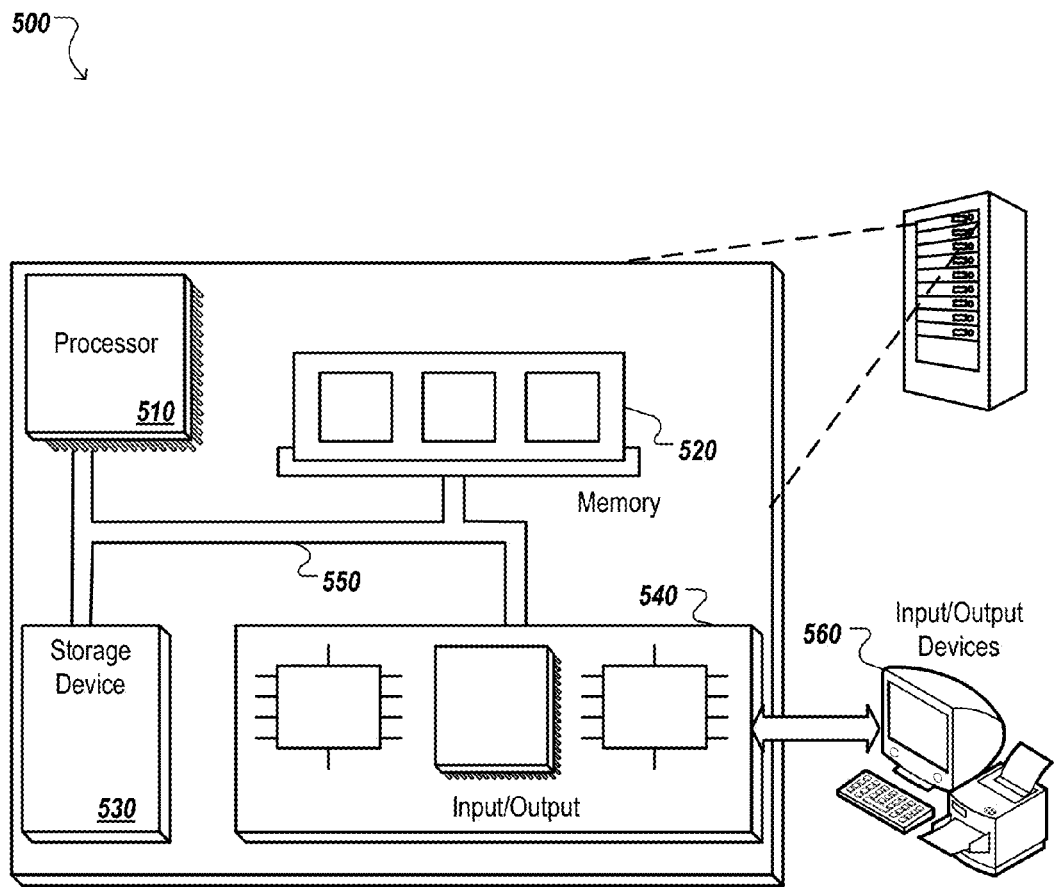
FIG. 5 is a block diagram of an example data processing apparatus.

FIG. 5 is a block diagram of an example data processing apparatus 500. The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more network interface devices, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   obtaining a collection of images;
   obtaining, for each image in the collection of images, image similarity data that indicates a measure of similarity of content depicted in the image to content depicted in other images in the collection of images;
   generating, based on the similarity data, two or more image clusters from the collection of images, each image cluster including one or more images from the collection of images;
   for each image cluster:
      obtaining, for each image in the image cluster, a set of image labels;
      generating, from each set of image labels obtained for each image in the image cluster, a set of cluster labels;
      selecting one or more cluster labels from the set of cluster labels;
   identifying the selected cluster labels as a set of collection labels for the collection of images;
   identifying one or more suggested image collections based on the set of collection labels, each of the suggested image collections being different from the collection of images, wherein the identifying the one or more suggested image collections includes,
      obtaining, for each of a plurality of candidate image collections, a corresponding candidate set of collection labels;
      obtaining, for each candidate set of collection labels, set similarity data that indicates a measure of similarity of the candidate set of collection labels to the set of collection labels;
      selecting, based on the set similarity data of the candidate sets of collection labels, one or more candidate image collections; and
      identifying the selected candidate image collections as suggested image collections;
   receiving, from a user device, a selection of one or more suggested image collections to include with the collection of images; and
   providing, to the user device, the selected one or more suggested image collections to be displayed along with the collection of images.

2. The method of claim 1, further comprising:
   providing the set of collection labels to a user device for display in association with the collection of images.

3. The method of claim 1, further comprising:
   identifying one or more candidate images based on the set of collection labels, each candidate image being different from each image in the collection of images; and
   providing data specifying one or more candidate images to a user device for display in association with the collection of images.

4. The method of claim 3, wherein identifying one or more candidate images comprises:
   providing one or more of the collection labels to an image search apparatus;
   obtaining result images from the image search apparatus; and
   identifying one or more of the result images as candidate images.

5. The method of claim 1, wherein the selected one or more suggested image collections are added to the collection of images.

6. The method of claim 1, wherein each image label included in the set of image labels has a respective confidence score that is a measure of confidence that the image label accurately describes the content depicted in the image; and
   wherein the set of cluster labels is generated based on the respective confidence scores of the image labels included in each set of image labels for each image in the image cluster.

7. The method of claim 1, wherein each image in the collection of images is included in only one of the image clusters.

8. A system comprising:
a data processing apparatus; and
a data store storing instructions that, when executed by the data processing apparatus, cause the data processing apparatus to perform operations comprising:
obtaining a collection of images;
obtaining, for each image in the collection of images, image similarity data that indicates a measure of similarity of content depicted in the image to content depicted in other images in the collection of images;
generating, based on the similarity data, two or more image clusters from the collection of images, each image cluster including one or more images from the collection of images;
for each image cluster:
obtaining, for each image in the image cluster, a set of image labels;
generating, from each set of image labels obtained for each image in the image cluster, a set of cluster labels;
selecting one or more cluster labels from the set of cluster labels;
identifying the selected cluster labels as a set of collection labels for the collection of images;
identifying one or more suggested image collections based on the set of collection labels, each of the suggested image collections being different from the collection of images, wherein the identifying the one or more suggested image collections includes,
obtaining, for each of a plurality of candidate image collections, a corresponding candidate set of collection labels;
obtaining, for each candidate set of collection labels, set similarity data that indicates a measure of similarity of the candidate set of collection labels to the set of collection labels;
selecting, based on the set similarity data of the candidate sets of collection labels, one or more candidate image collections; and
identifying the selected candidate image collections as suggested image collections;
receiving from a user device, a selection of one or more suggested image collections to include with the collection of images; and
providing, to the user device, the selected one or more suggested image collections to be displayed along with the collection of images.

9. The system of claim 8, wherein the operations further comprise:
providing the set of collection labels to a user device for display in association with the collection of images.

10. The system of claim 8, wherein the operations further comprise:
identifying one or more candidate images based on the set of collection labels, each candidate image being different from each image in the collection of images; and
providing data specifying one or more candidate images to a user device for display in association with the collection of images.

11. The system of claim 10, wherein identifying one or more candidate images comprises:
providing one or more of the collection labels to an image search apparatus;
obtaining result images from the image search apparatus; and
identifying one or more of the result images as candidate images.

12. The system of claim 8, wherein the selected one or more suggested image collections are added to the collection of images.

13. A non-transitory computer readable medium comprising instructions that, when executed by a data processing apparatus, cause the data processing apparatus to perform operations comprising:
obtaining a collection of images;
obtaining, for each image in the collection of images, image similarity data that indicates a measure of similarity of content depicted in the image to content depicted in other images in the collection of images;
generating, based on the similarity data, two or more image clusters from the collection of images, each image cluster including one or more images from the collection of images;
for each image cluster:
obtaining, for each image in the image cluster, a set of image labels;
generating, from each set of image labels obtained for each image in the image cluster, a set of cluster labels;
selecting one or more cluster labels from the set of cluster labels;
identifying the selected cluster labels as a set of collection labels for the collection of images;
identifying one or more suggested image collections based on the set of collection labels, each of the suggested image collections being different from the collection of images, wherein the identifying the one or more suggested image collections includes,
obtaining, for each of a plurality of candidate image collections, a corresponding candidate set of collection labels;
obtaining, for each candidate set of collection labels, set similarity data that indicates a measure of similarity of the candidate set of collection labels to the set of collection labels;
selecting, based on the set similarity data of the candidate sets of collection labels, one or more candidate image collections; and
identifying the selected candidate image collections as suggested image collections;
receiving, from a user device, a selection of one or more suggested image collections to include with the collection of images; and
providing, to the user device, the selected one or more suggested image collections to be displayed along with the collection of images.

14. The computer readable medium of claim 13, wherein the operations further comprise:
providing the set of collection labels to a user device for display in association with the collection of images.

15. The computer readable medium of claim 13, wherein the operations further comprise:
identifying one or more candidate images based on the set of collection labels, each candidate image being different from each image in the collection of images; and
providing data specifying one or more candidate images to a user device for display in association with the collection of images.

16. The computer readable medium of claim 15, wherein identifying one or more candidate images comprises:
providing one or more of the collection labels to an image search apparatus;

obtaining result images from the image search apparatus; and identifying one or more of the result images as candidate images.

17. The computer readable medium of claim 13, wherein the selected one or more suggested image collections are added to the collection of images.

* * * * *